(12) United States Patent
Jansson

(10) Patent No.: US 7,580,790 B2
(45) Date of Patent: Aug. 25, 2009

(54) DEVICE FOR COURSE INDICATION TO AID IN NAVIGATION

(75) Inventor: Dennis Jansson, Torsten Almsgatan 80, 3 Tr, Hägersten (SE) SE-12651

(73) Assignee: Dennis Jansson (SE)

( * ) Notice: Subject to any disclaimer, the term of this patent is extended or adjusted under 35 U.S.C. 154(b) by 168 days.

(21) Appl. No.: 11/884,739

(22) PCT Filed: Feb. 20, 2006

(86) PCT No.: PCT/SE2006/000225

§ 371 (c)(1),
(2), (4) Date: Sep. 21, 2007

(87) PCT Pub. No.: WO2006/088424

PCT Pub. Date: Aug. 24, 2006

(65) Prior Publication Data

US 2008/0103687 A1    May 1, 2008

(30) Foreign Application Priority Data

Feb. 21, 2005    (SE)    .................................... 0500398

(51) Int. Cl.
*G01C 21/30* (2006.01)
*G01C 21/00* (2006.01)

(52) U.S. Cl. ........................ 701/201; 701/209; 701/208; 701/210; 701/211; 701/212; 701/213; 340/995.17

(58) Field of Classification Search ......... 701/201–213; 340/990, 995.15, 995.17, 995.21; 342/357.06, 342/357.08, 357.13
See application file for complete search history.

(56) References Cited

U.S. PATENT DOCUMENTS

| 4,117,482 A | 9/1978 | Jepsky et al. |
| 4,811,679 A | 3/1989 | Masuzawa et al. |
| 7,216,034 B2 * | 5/2007 | Vitikainen et al. .......... 701/208 |
| 7,248,965 B2 * | 7/2007 | Tanizaki et al. ............. 701/208 |
| 2002/0072850 A1 | 6/2002 | McClure et al. |

FOREIGN PATENT DOCUMENTS

DE    4412859 C1    11/1994

OTHER PUBLICATIONS

International Search Report for PCT/SE2006/000225, mailed May 31, 2006.

* cited by examiner

*Primary Examiner*—Richard M. Camby
(74) *Attorney, Agent, or Firm*—Potomac Patent Group PLLC

(57) ABSTRACT

A navigation aid device for use when a predetermined route is followed, said route extending from a starting point along a series of break points up to a destination being the last break point. The device comprises an elongated course indication unit extending on either side of a fixed center point and indicating any necessary course adjustments by displaying an appearance pattern to the left or to the right relative the center point. A distance indication unit indicates how far it is up to the next break point. A central area in the appearance pattern is shown relatively wide in the course indication unit when greater course deviations can be tolerated, and is shown narrower when the course must be kept more precisely.

11 Claims, 3 Drawing Sheets

DEVICE FOR COURSE INDICATION TO AID IN NAVIGATION

Related Applications

This application claims priority and benefit from International Application No. PCT/SE2006/000225, filed Feb. 20, 2006, which claims priority and benefit from Swedish patent application No. 0500398-3, filed Feb. 21, 2005, the entire teachings of which are incorporated herein by reference.

TECHNICAL FIELD

The present invention relates to a navigation aid device for indicating a proper course when a user travels along a predetermined route, e.g. by means of a boat.

BACKGROUND OF THE INVENTION

During navigation when travelling towards a desired destination along a predetermined route at sea by boat, it is often important that this route is followed more or less precisely, partly for finding the right way up to the route destination and partly for avoiding grounding against any reefs and rocks under the water surface and the sea bed in ground water. For this purpose, maps are traditionally used in the form of nautical charts and optionally a compass, wherein the boat driver compares the map image with the reality and estimates visually where the boat is located on the nautical chart. If the driver does not already know the route "by heart", this must be done more or less continuously in order to make the navigation along the route correct and safe. As is well known, this may be a difficult task, particularly when the visibility is deteriorated and at larger bays where it is difficult to orientate oneself, and when the driver needs to concentrate on operating the boat. Likewise during orientation in land terrain or in the air, it is necessary to read a map and compare the map image with the reality in order to find the correct route.

In order to navigate at sea, the well-known GPS (Global Positioning System) technique is used today to an increasing extent for determining the boat position in relation to the surrounding water and land. A GPS apparatus utilizes satellite signals for calculating the position, and nautical charts exist in the form of software to be installed in a computer which, using received GPS signals, can indicate on a viewing screen the boat position on the map image during the drive. Thereby, the driver is not completely dependent on being able to correctly interpret islands, land and seamarks in the surroundings and estimate distances, etc., but may to a great extent rely on this indication for orientation, which is a great aid particularly at deteriorated visibility such as darkness and fog.

Known navigation systems also exist having indication of how the course should be adjusted in order to follow a predetermined route, e.g. by means of visual indication of necessary course adjustment starboard/port (right/left).

US 2002/0072850 A1 discloses a GPS-based steering aid device for a mowing vehicle that must at all times keep a straight course along a desired route line PP, in order to produce a straight mowing row. An array of luminous diodes on a display 32 shows how great the deviation T of the vehicle is from the route line PP. Furthermore, the necessary course correction is shown by selecting at regular intervals a point of reference IC somewhere on the route line PP, towards which point the user should steer. Next, an angle S is calculated by which the vehicle should change its course in order to steer towards the selected point of reference IC, which is indicated by means of an array of luminous diodes on a display 30. Thus, the display 30 shows an angle of correction towards the selected point of reference IC, and not the steering error angle E.

Further, U.S. Pat. No. 4,811,679 A discloses a navigation system where an elongated appearance pattern is displaced laterally on a display depending on course deviations. DE 4412859 C1 discloses a navigation system for road vehicles where a direction arrow shows the direction of the next turn-off, and the distance thereto is indicated by means of a "bar diagram" in the shaft of the arrow. U.S. Pat. No. 4,117,482 A discloses another navigation system for a boat over a number of turning points on a route in a watercourse, where the distance to the next turnoff is shown as a numerical value (in foot) on a display 39.

However, it is a problem not knowing how great accuracy is required for maintaining the course during the drive. For example, during a boat drive over large open water areas at a safe distance away from islands and ground water etc., it is not that important to follow a route exactly, and in that case it may be desirable for the driver to reduce his/her attention. On the other hand, it is more important to follow a precise route in narrow passages and/or where ground water is present, which is not unusual even at apparently open waters, thus demanding relatively greater attention from the driver. However, the navigation systems known today do not provide any instructions on how great accuracy the course must be maintained with in different situations.

Hence, there is a need for an improved aid for navigation and orientation when following a predetermined route, with distinct and easily read visual indication of the correct course and of how great the demand is for course adjustments. This information should be easy to see and grasp in a correct manner, even by means of merely a swift glance, particularly when the driver's attention may be needed for focusing on other things.

SUMMARY OF THE INVENTION

It is an object of the present invention to provide a simple, effective and relatively inexpensive solution for safely indicating the course during movement along a predetermined route.

Another object of the present invention is to provide a course indication that is chiefly easy to see and grasp in a correct manner, without demanding more than necessary attention from a user. Another object is to minimise the time the user have to look at the course indication in order to still maintain the correct course during the drive.

The present invention intends to meet these objects and others, and comprises a navigation aid device for use when a predetermined route is followed, said route extending from a staring point along a series of break points up to a destination as the final break point. This route is formed by connecting said points with mainly straight sections. The device includes an elongated course indication unit extending on both sides of a fixed centre point and being adapted to indicate any necessary course adjustments by displacing an appearance pattern to the left or to the right relative to the centre point, and a distance indication unit being adapted to indicate how far it is to the next break point.

The course indication unit is preferably arranged substantially horizontally on a panel, while the distance indication unit is suitably arranged substantially vertically on the panel.

The course indication unit is further adapted to indicate whether the course needs correction, by the appearance pattern containing at least one central area located nearest to the centre point having a first appearance, and two areas located on either side having a second appearance. The central area having the first appearance is shown relatively wide in the course indication unit when greater course deviations can be tolerated, and narrower when the course must be kept more precisely. These two appearances may be shown as different colours or light intensities, preferably by means of light diodes, LCD fields or the like.

The magnitude of the lateral displacement of the appearance patterns may be proportional to the actual deviation from a straight line between two break points, in order to provide an impression of how much the course needs to be corrected.

The distance indication unit is suitably elongated having a first area indicating the relative distance to the previous break point, and a second area indicating the relative distance to the next break point.

The distance indication unit and/or the course indication unit may also be adapted to change its indication character, in order to draw attention to the fact that the course must be changed when a break point is reached or when the course deviation becomes unacceptable.

The device may also be adapted to indicate that the course needs to be changed when entering a break point area in connection with a break point, by changing the character of the indication in the distance indication unit and/or the course indication unit, or by indication in a separate break point indication unit. Different break point areas may also have different sizes depending on how rapidly and/or accurately the course needs to be changed, and the indication of entrance into a break point area may then reflect this by means of different character depending on the break point area size.

BRIEF DESCRIPTION OF DRAWINGS

The present invention is described in more detail below by means of preferred embodiments and with reference to the accompanying drawings.

DETAILED DESCRIPTION OF PREFERRED EMBODIMENTS

Figure 1:
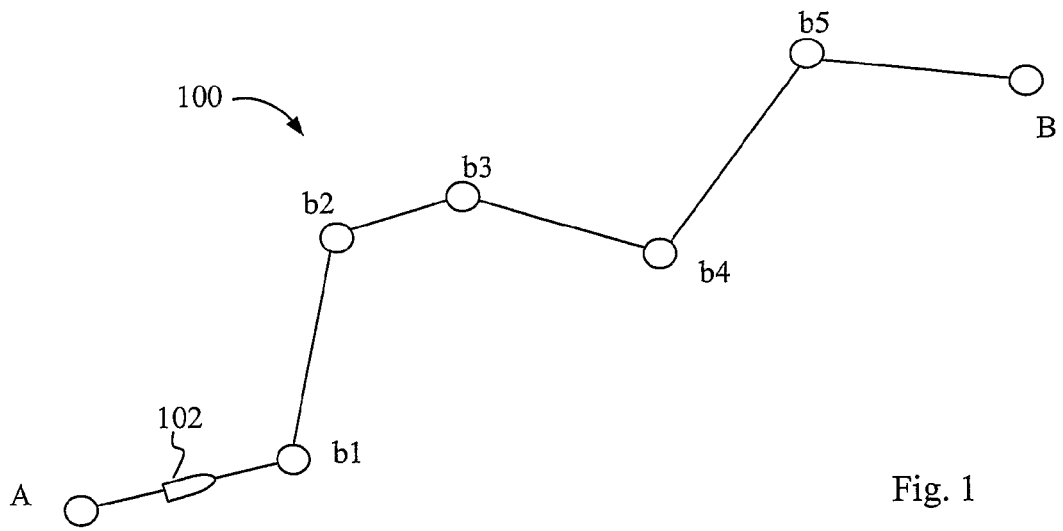
FIG. 1 is a schematic view of an exemplary predetermined route.

FIG. 1 illustrates schematically an exemplary predetermined route 100 at sea that a boat 102 shall follow during transportation between a starting point A and a destination B. The route has been determined with respect to islands, reefs, grounds, depths, etc., thus containing a series of break points b1-b5 along the route. The break points are selected to ensure that the present boat can safely travel mainly straight between these, at no risk of colliding and running aground. Hence, a boat driver is required to basically change the course only at each break point towards the next break point, while a more or less straight course can be held there between. Initially after embarking from the starting point A, the boat should be steered towards the first break point b1, and when it has reached b1 it will change its course and be steered towards the next break point b2, and so forth. In the following description, destination B can be regarded as a final break point.

Figure 2:
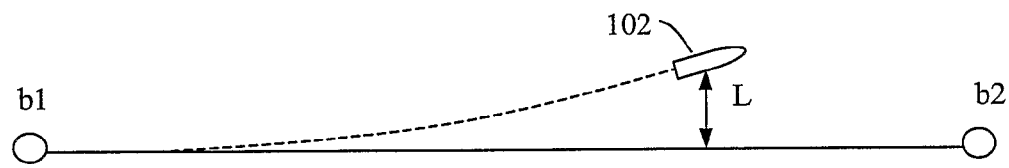
FIG. 2 illustrates schematically a boat deviating from a straight course between two break points in a predetermined route.

FIG. 2 illustrates that the boat 102 during the drive (dashed line) between two break points b1 and b2 deviates from a straight line there between (continuous line) by a distance L. When the deviation L becomes large enough, the boat course must be corrected in order not to jeopardize security, which can be indicated to the driver as described below.

Figure 3A:
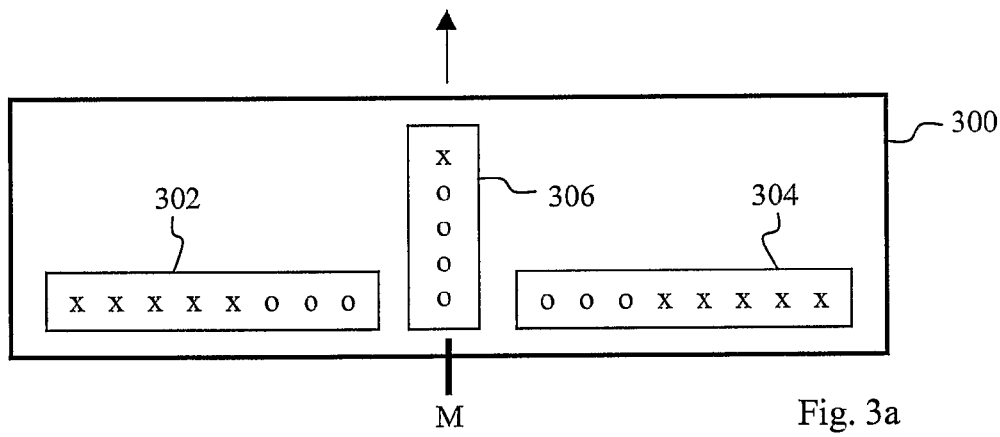
FIG. 3a is a schematic view of a first embodiment of a panel for course indication when the held course is mainly correct.

FIG. 3a illustrates an indication panel 300 according to a first embodiment, designed as a navigation and/or orientation aid for a user travelling along a predetermined route at sea, on land or in the air, wherein the case of being at sea will be used in the following description.

The panel 300 includes an elongated course indication unit extending on either side of a fixed centre point M and being adapted to indicate any necessary course adjustments by displacing an appearance pattern to the left or to the right relative the centre point M. The course indication unit extends substantially horizontally in the panel, and in this embodiment, it is divided into a separate left side part 302 and a separate right side part 304 on either side of the centre M. The panel 300 further comprises a distance indication unit 306 that suitably extends substantially vertically in the panel. In this context, it should be noted that the terms "horizontally" and "vertically" should be understood as relative directions and not necessarily in a strict sense.

The course and distance, respectively, are indicated in the panel 300 preferably by means of points or fields that may adopt a first appearance or a second appearance, said appearances being schematically shown in the figure as "o" or "x". The course and distance indication means 302-306 are controlled by signals generated based on stored map and route information as well as position data received from a GPS unit, not shown, which will be described in more detail below in connection with FIG. 4.

During use, the course indication unit 302, 304 indicates to the driver whether the drive direction is correct or needs to be adjusted, by generally showing a first appearance "o" nearest to the centre point M and a second appearance "x" farther out in the flanks. At correct course, the appearance patterns in the left side part 302 and the right side part 304 should ideally be mutual mirror images, that is, an area having the first appearance "o" is shown symmetrically around the centre extending equally much in both sides, and areas having the second appearance "x" are shown outside the first appearance on both sides. This is the case in FIG. 3a where the number of "o" and "x" are equal on both sides 302, 304, and the course can thus be kept straight on according to the arrow.

Figure 3B:
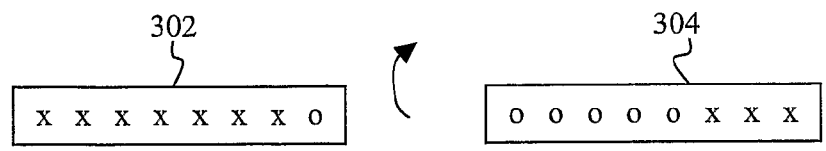
FIG. 3b illustrates parts of the panel of FIG. 3a when the held course needs to be corrected to the right.
Figure 3C:
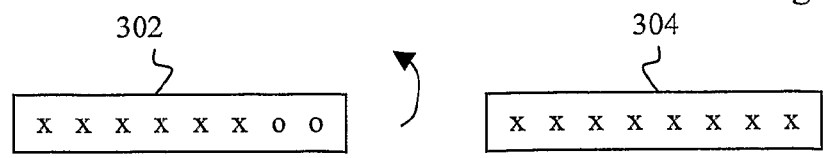
FIG. 3c illustrates parts of the panel of FIG. 3a when the held course needs to be corrected to the left.

For example, if the boat 102 runs increasingly out of course to the left, as shown in FIG. 2, the appearance pattern including the first appearance "o" will be displaced e.g. to the right as shown in FIG. 3b. Thus, this indicates that the course should be corrected to the right according to the arrow, until the appearance pattern is again shown symmetrically around the centre, i.e. having the first appearance extending equally long in both sides. However, if the appearance pattern including the first appearance "o" is displaced to the left as shown in FIG. 3c, this indicates that the boat deviates to the right and the course should be corrected to the left according to the arrow. The magnitude of the displacement of the appearance patterns laterally is preferably proportional to the actual deviation L of the boat from a straight line between two break points, such that the driver obtains a perception of how much the course needs to be corrected.

The display of both appearances is designed such that the first appearance is shown across a relatively wide area in the course indication unit when greater course deviations can be tolerated, e.g. when located on large open spaces with deep water, while the first appearance is shown as a more narrow area when the course must be kept more precisely, e.g. in tight passages between islands and/or grounds or when shallow water occurs. In FIG. 3b, an exemplary relatively broad area is shown having six "o"s, and greater course deviations can thus be tolerated without risking ground or land impact, while in FIG. 3c, a relatively narrow area is shown having merely two "o"s, implying that only minor course deviations can be tolerated.

By means of this unique function, it is shown in a lucid manner how accurate the correct course must be maintained, without requiring more that necessary attention from a user. In particular, the user/driver can be allowed decreased attention when the first appearance is shown across a wide area, which may be the case during a major part of a boat drive, while greater attention is required when a narrower area indicates that the course must be kept more precisely. Hence, this may be highly desirable when the visibility is limited, and/or when grounds and shallow rocks may occur in apparently open waters.

In practice, said first and second appearances may be shown as different colours or light intensities, preferably by means of light diodes or similar that can give light with two different colours, e.g. red and green. Thus, each "o" in the figure may be a diode giving green light, while each "x" is a diode giving red light. However, it is readily understood by those skilled in the art that also other means for obtaining two different appearances may be employed to this end, e.g. as switched-on or switched-off diodes/lamps/fields, or using LCD-technology (liquid crystal display) displaying black or white fields. The present invention is thus not limited in this respect.

As mentioned above, the indication panel 300 further comprises a preferably vertically arranged distance indication unit 306 being adapted to indicate how far it is up to the next break point. This information may also be shown preferably by means of a first appearance and a second appearance, although not necessarily being the same type of appearances as in the course indication unit 302, 304. In the schematic FIG. 3a, both appearances are illustrated as "o" and "x", respectively, where the area having a first appearance "o" may indicate the relative distance to the previous break point, e.g. b1 in the situation according to FIG. 2, and the area having the second appearance "x" may then indicate the relative distance to the forthcoming break point, e.g. b2 in FIG. 2, or vice versa. Hence, the area having the first appearance "o" will expand and the area having the second appearance "x" will diminish as the boat travels from b1 towards b2. By means of this simple and lucid indication, the driver can quickly see when a new break point is reached and it is time to change the course. Otherwise, it is sufficient to maintain a straight course, requiring a minimum of attention by means of short glances on the course indication unit.

Furthermore, when a break point is reached, and/or when the course deviation becomes too large, the distance indication unit 306 and/or the course indication unit 302, 304 may be adapted to change the indication character in order to catch the driver's attention to the fact that the course needs to be changed, e.g. by twinkling, changing the colour or intensity, etc. In particular, one side of the course indication unit 302 or 304 may preferably be made to twinkle or shine brighter in order to clearly show the driver in which direction the course should be adjusted.

Figure 4:
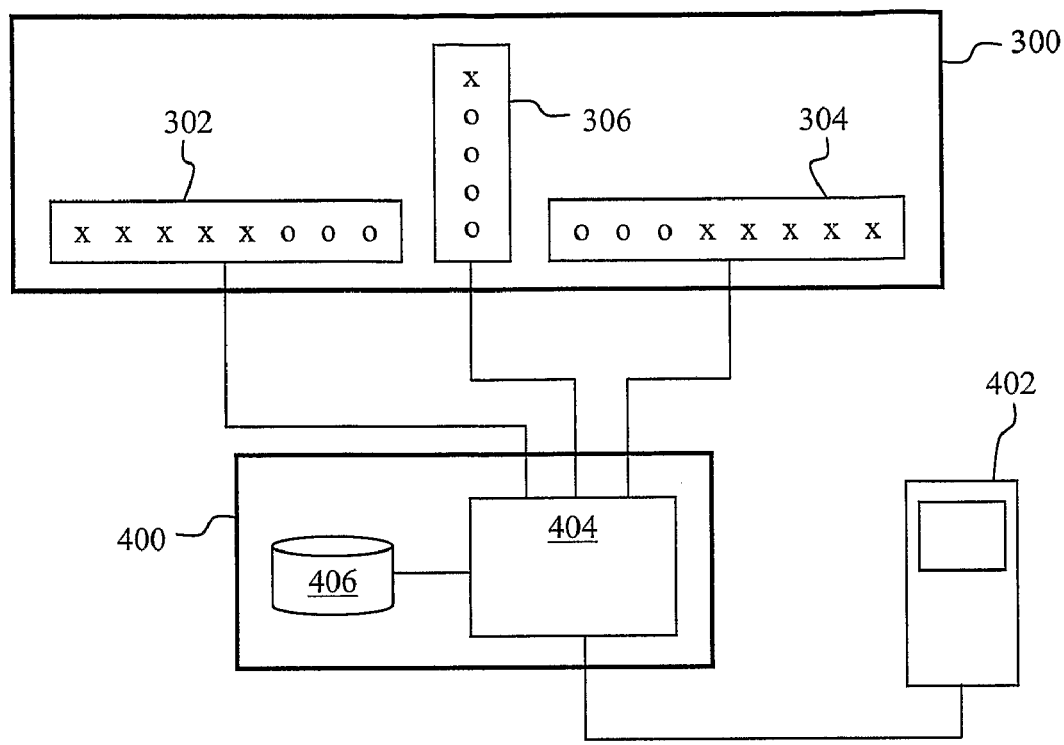
FIG. 4 is a block diagram illustrating how a navigation aid device can be controlled to indicate the course and the break point distance.

FIG. 4 illustrates schematically how an indication panel 300 according to the above description can be connected to a control unit 400 which in turn receives current position information from a GPS-unit 402. The control unit 400 comprises a logic unit 404 that is adapted, using suitable software, to compare current position information from the GPS unit 402 with a predetermined route being stored on a storage unit 406. The logic unit 404 is further adapted to calculate any course deviations based on said comparison and to output corresponding suitable parameter values associated therewith to the flank parts of the course indication unit 302 and 304, e.g. in the form of control voltage or the like. The logic unit 404 is further adapted to also calculate the current distance to the next break point based on said comparison, and to output corresponding parameter values to the distance indication unit 306. The device may also comprise regulators (not shown) for setting the light intensity, sensitivity, etc.

The skilled person understands that the above-mentioned parameters for course deviations and break point distances may be designed in various alternative ways to enable the units 302-306 for course and distance indication to display relevant information according to the above function, and it is not necessary to further describe these signals in more detail here. It should also be noted that FIG. 4 only discloses a schematic example of how the invented device can be made up, while also other logic structures are conceivable to the skilled person within the scope of this invention. For example, the route may be programmed in the GPS unit, which then may be also programmed to calculate any course deviations and current distances up to the next break point, and to output corresponding parameter values to the control unit 400.

Figure 5:
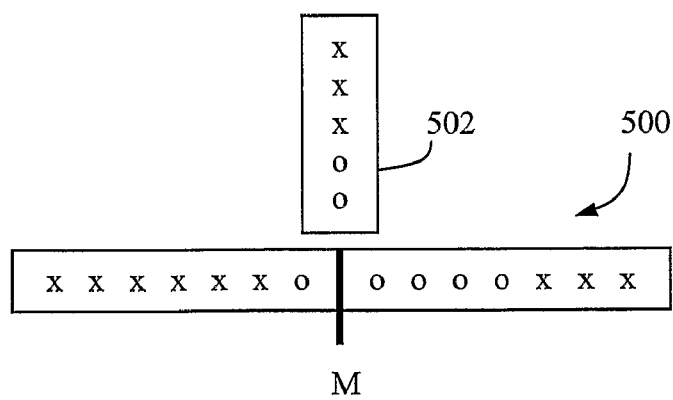
FIG. 5 is a schematic view of a second embodiment of a panel for course indication.
Figure 6:
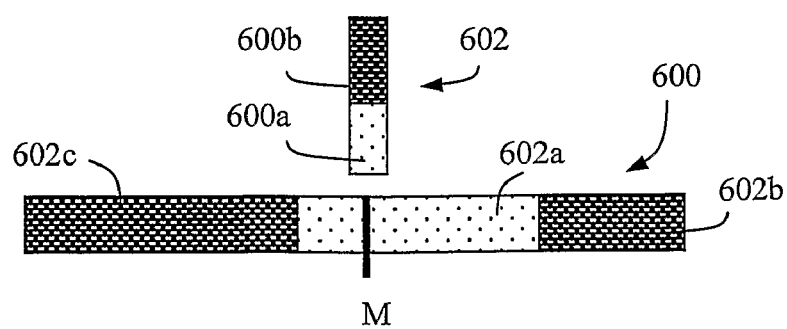
FIG. 6 is a schematic view of a third embodiment of a panel for course indication.

In FIGS. 5 and 6, some alternative embodiments of indication means are shown. In FIG. 5, a course indication unit 500 is formed as a continuous elongated unit that can display different appearances "o,x", using diodes or the like according to the above, on either side of a centre point M. Here, the appearance pattern is displayed to the right wherein the course should be adjusted to the right. A vertical distance indication unit 502 is placed centrally above the course indication unit 500, although it may as well be placed, e.g., on the side.

In FIG. 6, another continuous elongated course indication unit 600 is shown displaying an appearance pattern having areas on either side of a centre point M where the information is indicated as fields of different appearances. Thus, also in this case, a central field 602a having a first appearance and flanking fields 602b,c having a second appearance are displaced to the right, thereby indicating that the course should be adjusted to the right. The width of the central field 602a having the first appearance may be varied depending on the accuracy requirements, as described above. A vertical distance indication unit 602 displays a lower field 600a having one appearance and an upper field 600b having another appearance, said fields indicating the current distance to the previous and next break points, respectively.

It is readily understood by the skilled person that the above-described embodiments can be varied in various different ways within the scope of the invention. For example, as mentioned above, the first appearance may generally be shown "switched-on", while the second appearance may be shown "switched-off", or vice versa, or as different colours, shades and/or intensities.

It is not necessary that said first and second appearances in the respective course and distance indication units are shown in the same manner, but they are basically independent of each other. Further, the device could as well be arranged such that a displacement of the pattern to the right in the course indication unit indicates that the course should be adjusted to the left, and vice versa. Still further, the appearance pattern may contain more than two different appearances. For example, around a centrally located colour further colours may be arranged farther out on the sides, wherein a change of course becomes absolutely necessary once a final outmost colour has been displaced to the centre point.

As mentioned above, the distance indication unit 306 and/or the course indication unit 302, 304 may twinkle or otherwise change character in order to draw the driver's attention to the fact that it is necessary to change the course when a break point in reached. According to a further embodiment, this may occur when entering a certain area in connection with a break point, which is illustrated schematically in FIG. 7. Thus, when the boat 102 shown in FIG. 1 is about to pass break points b1 and b2, the panel may in a suitable manner first indicate that the boat has entered a break point area 700 around break point b1, implying that a change of course towards the next break point b2 should be commenced, and then indicate when the boat enters a next break point area 702 around break point b2, and so forth. When the boat leaves each respective break point area 700, 702, the panel may revert to normal indication of course and distance according to the above.

Such indication of entering a break point area may be effected in any elective manner, however diverging from the normal indication of course and distance occurring when driving between different break point areas, e.g. by twinkling or changing colour/shade/intensity in the distance indication unit 306 and/or the course indication unit 302, 304, or by means of a not shown third indication unit, which as an example may be referred to as a "break point indication unit".

Figure 7:
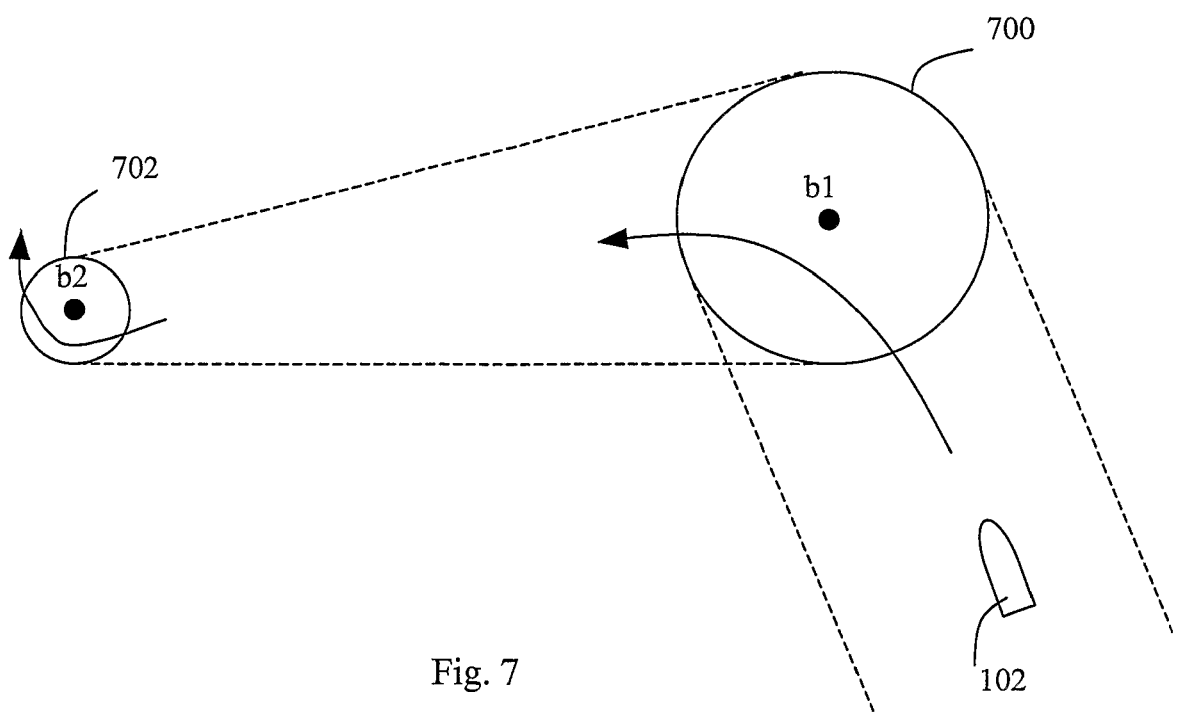
FIG. 7 illustrates schematically two break point areas of different sizes that a boat shall pass.

As shown in FIG. 7, these break point areas may also be of different sizes depending on how rapidly and/or accurately the course must be changed, being more critical in, e.g., narrow passages between islands and/or grounds as compared to large open spaces in deep waters. In the shown example, the break point area 700 is larger than break point area 702. Then, the indication of entrance into a break point area may also reflect this by getting different character depending on the break point area size. The break point areas 700, 702 are shown being circular, although other shapes may be used as well.

In a practical example, the distance indication unit or the course indication unit or a separate break point indication unit (not shown) may change colour when entering a break point area and may in addition twinkle rapidly if the break point area is small, and slowly if it is large. The skilled person readily understands that this difference of indication character for different break point areas can be selected freely, e.g. with respect to colour, shade, twinkling, intensity, form, etc.

Of course, further modifications and combinations of the above-described embodiments are conceivable within the scope of the invention. Hence, the invention is not merely limited to the described embodiments, however being generally defined by the following claims.

The invention claimed is:

1. A navigation aid device for use when a predetermined route is followed, said route extending from a starting point along a series of break points up to a destination being the last break point, such that the route is formed by connecting said point with mainly straight sections comprising:
   an elongated course indication unit extending on either side of a fixed center point and being adapted to indicate any necessary course adjustments by displacing an appearance pattern to the left or to the right relative the center point, said course indication unit being adapted to show whether it is necessary to correct the course, by the appearance pattern containing at least one central area located nearest to the center point having a first appearance ("o") and two areas located on either side having a second appearance ("x"), and
   a distance indication unit being adapted to indicate how far it is up to the next break point,
   wherein
   the central area having the first appearance is shown relatively wide in the course indication unit when greater course deviations can be tolerated, and more narrow when the course must be kept more precisely.

2. A device according to claim 1, wherein the course indication unit is arranged substantially horizontally on a panel, while the distance indication unit is arranged substantially vertically on the panel.

3. A device according to claim 1, wherein said two appearances are shown as different colors or light intensity, preferably by means of light diodes, LCD-fields or the like.

4. A device according to claim 1, wherein the magnitude of the lateral appearance pattern displacement is proportional to the actual deviation from a straight line between two break points, in order to provide an impression of how much the course needs to be corrected.

5. A device according to claim 1, wherein the distance indication unit is shaped elongated having a first area indicating the relative distance to the previous break point, and a second area indicating the relative distance to the next break point.

6. A device according to a claim 1, wherein the distance indication unit and/or the course indication unit is/are adapted to change its indication character, in order to draw attention to the fact that the course needs to be changed when a break point is reached or when the course deviation becomes unacceptable.

7. A device according claim 1, wherein the course and distance indication units are controlled by signals being generated based on stored map and route information and also position information received from a GPS-unit.

8. A device according to claim 7, further comprising a control unit including a logic unit and a storage unit having the predetermined route stored, wherein the logic unit is adapted to compare current position information from the GPS-unit with the predetermined route, to calculate any occurring course deviations based on said comparison, and to output corresponding parameter values to the course and distance indication units to make them indicate any necessary course adjustments and how far it is up to the next breakpoint.

9. A device according to claim 1, adapted to indicate that the course should be changed when entering a break point area in connection with a break point.

10. A device according to claim 9, adapted to indicate entrance into said break point area by changing the indication character in the distance indication unit and/or the course indication unit, or by indication in a separate break point indication unit.

11. A device according to claim 9, wherein different break point areas are of different sizes depending on how rapidly and/or accurately the course needs to be changed, and said indication of entrance into a break point area reflects this by means of different character depending on the break point area size.

* * * * *